(12) United States Patent
Huang et al.

(10) Patent No.: US 8,811,256 B2
(45) Date of Patent: Aug. 19, 2014

(54) SUBFRAME PROCESSING METHOD AND DEVICE

(75) Inventors: Qufang Huang, Shanghai (CN); Wenji Liu, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/433,876

(22) Filed: Mar. 29, 2012

(65) Prior Publication Data
US 2012/0182923 A1    Jul. 19, 2012

Related U.S. Application Data

(63) Continuation of application No. PCT/CN2010/077371, filed on Sep. 27, 2010.

(30) Foreign Application Priority Data

Sep. 29, 2009    (CN) .......................... 2009 1 0110717

(51) Int. Cl.
*H04H 20/71*    (2008.01)

(52) U.S. Cl.
USPC ........................................................ 370/312

(58) Field of Classification Search
USPC ........................................................ 370/312
See application file for complete search history.

(56) References Cited

U.S. PATENT DOCUMENTS

| | | | |
|---|---|---|---|
| 2005/0129042 A1* | 6/2005 | Muhonen et al. | 370/412 |
| 2006/0088023 A1 | 4/2006 | Muller | |
| 2010/0027455 A1* | 2/2010 | Wang | 370/312 |
| 2010/0195558 A1* | 8/2010 | Koskinen | 370/312 |
| 2011/0044225 A1* | 2/2011 | Rinne et al. | 370/312 |
| 2012/0182923 A1* | 7/2012 | Huang et al. | 370/312 |

FOREIGN PATENT DOCUMENTS

| | | |
|---|---|---|
| CN | 101247544 A | 8/2008 |
| CN | 101931881 A | 12/2010 |
| WO | WO 2008/155332 A2 | 12/2008 |

OTHER PUBLICATIONS

European Patent Office Communication related to the extended European search report, pursuant to Rule 62 EPC, the supplementary European search report and the European search opinion, dated (mailed) May 24, 2012, issued in related European Patent Application No. 10819897.9-2413 (12 pgs).

(Continued)

*Primary Examiner* — Luat Phung

(74) *Attorney, Agent, or Firm* — Slater & Matsil, L.L.P.

(57) ABSTRACT

A subframe processing method and device are disclosed. The subframe processing method includes: if data packets that are not received by an evolved NodeB (eNB) include at least two consecutive Multimedia Broadcast Multicast Service (MBMS) data packets to be scheduled in a Dynamic Schedule Period (DSP) by the eNB, setting a subframe of the eNB that is used to transmit Dynamic Schedule Information (DSI) corresponding to the DSP to null. When the eNB finds that consecutive MBMS data packets are lost and/or that a type 0 Protocol Data Unit (PDU) group is lost, a subframe used to transmit the DSI may be set to null, thereby preventing the eNB from transmitting incorrect DSI which may interfere with other eNBs and cause incorrect data receiving of a user equipment (UE).

17 Claims, 3 Drawing Sheets

(56) References Cited

OTHER PUBLICATIONS

3GPP TS 36.300 V8.3.0 (Dec. 2007); *Technical Specification*; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) (120 pgs.).

ETS I TS 136 300 V8.9.0 (Jul. 2009); *Technical Specification*; LTE; Evolved Universal Terrestrial Radio Access (E-UTRA) and Evolved Universal Terrestrial Radio Access Network (E-UTRAN); Overall description; Stage 2 (3GPP TS 36.300 version 8.9.0 Release 8) (164 pgs.).

Written Opinion of the International Searching Authority (Translation), dated (mailed) Jan. 6, 2011, related to Application No. PCT/CN2010/07371; International Filing Date of Sep. 27, 2010; Huawei Tech Co., Ltd. et al. (5 pgs.).

International Search Report (Translation), dated (mailed) Jan. 6, 2011, related to Application No. PCT/CN2010/077371; International Filing Date of Sep. 27, 2010; Huawei Tech Co., Ltd. et al. (5 pgs.).

First Chinese Office Action (Translation) dated (mailed) Jun. 29, 2011, related to Chinese Patent Application No. 200910110717.0 (Chinese vs. encl.) (14 pgs.).

Second Chinese Office Action (Translation) dated (mailed) Sep. 28, 2011, related to Chinese Patent Application No. 200910110717.0 (Chinese vs. encl.) (15 pgs.).

3GPP TSG-RAN3 Meeting #66 (R3-093331); Jeju, Korea Nov. 9-13, 2009; Title: CR on Mechanism for Consecutive Packet Loss in 36.300; Source to WG: CMCC, ZTE, Alcatel-Lucent Shanghai Bell, Alcatel-Lucent, CATT, Huawei, New Postcom, Samsung; Source to TSG: R3; Work Item code: MBMS_LTE; (4 pgs).

3GPP TSG-RAN WG2 Meeting #68 (R2-096534); Jeju, Korea Nov. 9-13, 2009; Title: Muting DSI; Source to WG: Huawei; Source to TSG: RAN2; Work Item code: MBMS_LTE; (3 pgs).

3GPP TSG-RAN WG2 Meeting #68bis (R2-100211); Valencia, Spain Jan. 18-22, 2010; Agenda item: 6.3.1; Source: Nokia Corp., Nokia Siemens Networks; Title: Uncaptured agreements on muting the DSI; Document for: Discussion and Decision (3 pgs.).

Chinese Office Action received in Application No. 201210057996.0 mailed Mar. 5, 2014, 7 pages.

Chinese Search Report received in Application No. 2012100579960 mailed Feb. 25, 2014, 3 pages.

* cited by examiner

▨ Header of an MBMS data packet, in which the number indicates the total number of octets (in octets)

☐ MBMS data packet, in which the number indicates the length of the data packet (in octets)

☐ Synchronization sequence including at least one MBMS data packet

⌞⁻⌡ Synchronization sequence including an empty MBMS data packet

▨▨▨▨ Type 0 PDU

SUBFRAME PROCESSING METHOD AND DEVICE

CROSS-REFERENCE TO RELATED APPLICATIONS

This application is a continuation of International Application No. PCT/CN2010/077371, filed on Sep. 27, 2010, which claims priority to Chinese Patent Application No. 200910110717.0, filed on Sep. 29, 2009, both of which are hereby incorporated by reference in their entireties.

FIELD OF THE INVENTION

The present invention relates to the field of mobile communications technologies, and in particular, to a subframe processing method and device.

BACKGROUND OF THE INVENTION

In a long term evolution (LTE) system, Multimedia Broadcast Multicast Service (MBMS) data may be transmitted in MBMS Single Frequency Network (MBSFN) mode. That is, multiple evolved NodeBs (eNBs) transmit radio signals carrying the same MBMS data with the same frequency at the same time from multiple cells. An area covered by the multiple eNBs that transmit the MBMS data in MBSFN mode is called an MBSFN area. User equipments (UEs) in the MBSFN area may consider that only one transmitter is transmitting radio signals and receive the MBMS data.

Data transmitted by the eNBs in the MBSFN area is the same, and the physical resources used are the same. That is, information of each eNB is synchronous. For example, a synchronization (SYNC) entity is set on the broadcast multicast-service center (BM-SC) side on the core network (CN) and an SYNC entity is set on the eNB side. The SYNC entity on the BS-SC side sets a time stamp for various MBMS data packets and provides the time stamp for all eNBs in the MBSFN area. Specifically, the BM-SC may include multiple MBMS data packets in a synchronization sequence. The SYNC entity on the BM-SC side sets the same time stamp for MBMS data packets in a synchronization sequence and transmits a type 0 control packet (namely, a type 0 Protocol Data Unit (PDU), hereinafter referred to as a type 0 PDU) after the BM-SC transmits the synchronization sequence. The type 0 PDU is used to notify the eNBs of transmission completion of the current synchronization sequence. To improve the reliability, the SYNC entity on the BM-SC side transmits a type 0 PDU group but not merely a type 0 PDU. The type 0 PDU group includes all type 0 PDUs that include the same information and are transmitted repeatedly. For example, after a synchronization sequence is transmitted, a type 0 PDU is transmitted consecutive three times. The three type 0 PDUs form one type 0 PDU group.

When receiving the MBMS data, eNB determines the time when the BM-SC starts to transmit the synchronization sequence according to the time stamp obtained by the SYNC entity on the eNB side, and determines reception completion of the synchronization sequence according to the type 0 PDU. The eNB transmits the received MBMS data packets according to the time stamp of the received MBMS data packets.

If the eNBs in the MBSFN area have buffered all MBMS data packets to be transmitted in a Dynamic Schedule Period (DSP) before the DSP, the eNBs can generate the same Dynamic Schedule Information (DSI) to implement the same dynamic scheduling for the same MBMS data packets. For example, the eNBs have buffered all the MBMS data packets to be transmitted in the DSP before the DSP. The eNBs determine the time for transmitting the MBMS data packets, and then generate DSI corresponding to the DSP to indicate scheduling of the DSP, for example, the start positions of data packets of different services in the DSP. In a first MBSFN subframe on a multicast channel (MCH), the eNBs transmit the DSI of the corresponding transmission channel in the DSP and transmit the data packets according to the scheduling result. A UE at the receiving end receives the DSI, knows eNB scheduling according to the DSI, and thus selects the time when the eNBs transmit data that is interesting to the UE to receive data.

In evolved MBMS, air interface resources of the MBSFN service are reserved in advance in a manner of semi-persistent scheduling. A reserved subframe that is used to transmit MBSN data is called an MBSFN subframe. To meet different quality of service (QoS) requirements of different MBSFN services, the evolved MBMS maps the MBSFN services to different MCHs, and the different MCHs adopt different Modulation Coding Schemes (MCSs) to achieve different QoS. Different MCHs do not share a reserved MBSFN subframe. To reduce scheduling overheads, the eNBs perform air-interface transmission scheduling for MBMS data in each DSP. The eNBs only schedule MBSFN data of which time stamp is earlier than the start time of the corresponding DSP. Generally, the eNBs schedule the corresponding MBSFN data in one DSP that is later than a time stamp.

In the prior art, transmission between a BS-SC and an eNB is based on the Internet Protocol (IP), which may cause loss of MBMS data packets or a type 0 PDU. If an eNB in an MBSFN area cannot normally receive at least two consecutive MBMS data packets in a synchronization sequence or all type 0 PDUs that indicate transmission completion of a synchronization sequence, the eNB generates incorrect DSI, which may interfere with other eNBs and cause incorrect data receiving of the UE.

SUMMARY OF THE INVENTION

Embodiments of the present invention provide a subframe processing method and device.

A subframe processing method is provided, where the method includes:
    if data packets that are not received by an eNB include at least two consecutive MBMS data packets to be scheduled by the eNB in a DSP, setting, by the eNB, a subframe that is used to transmit DSI corresponding to the DSP to null.

Another subframe processing method is provided, where the method includes:
    if an eNB does not receive a type 0 control packet group, setting, by the eNB, a subframe that is used to transmit DSI corresponding to a DSP to null, in which the DSP is used to transmit MBMS data packets corresponding to the type 0 control packet group.

A subframe processing device is provided, where the device includes:
    a first receiving unit, configured to determine whether data packets that are not received meet a first condition: the data packets that are not received include at least two consecutive MBMS data packets to be scheduled by a first sending unit in a DSP; and
    the first sending unit, configured to set a subframe that is used to transmit DSI corresponding to the DSP to null when the determination result of the first receiving unit is yes.

Another subframe processing device is provided, where the device includes:
a second receiving unit, configured to determine that a type 0 control packet group is not received; and
a second sending unit, configured to set a subframe that is used to transmit DSI corresponding to a DSP to null when the determination result of the second receiving unit is yes, in which the DSP is used to transmit MBMS data packets corresponding to the type 0 control packet group.

In embodiments of the present invention, when an access network (AN) device (such as an eNB) finds that consecutive MBMS data packets are lost and/or a type 0 PDU group is lost, a subframe that is used to transmit DSI may be null to prevent the eNB from transmitting incorrect DSI which may interfere with other eNBs and cause incorrect data receiving of a UE.

DETAILED DESCRIPTION OF THE EMBODIMENTS

The technical solution of the present invention will be clearly and completely described in the following with reference to the accompanying drawings. It is obvious that the embodiments to be described below are only a part rather than all the embodiments of the present invention. All other embodiments obtained by persons or ordinary skill in the art based on the embodiments of the present invention without any creative effort shall fall within the protection scope of the present invention.

An embodiment of the present invention provides a subframe processing method. According to the method, if data packets that are not received by an eNB include at least two consecutive MBMS data packets to be scheduled by the eNB in a DSP, the eNB sets a subframe that is used to transmit DSI corresponding to the DSP to null to prevent the eNB from transmitting incorrect DSI which may interfere with other eNBs and cause incorrect data receiving of a UE.

Figure 1:
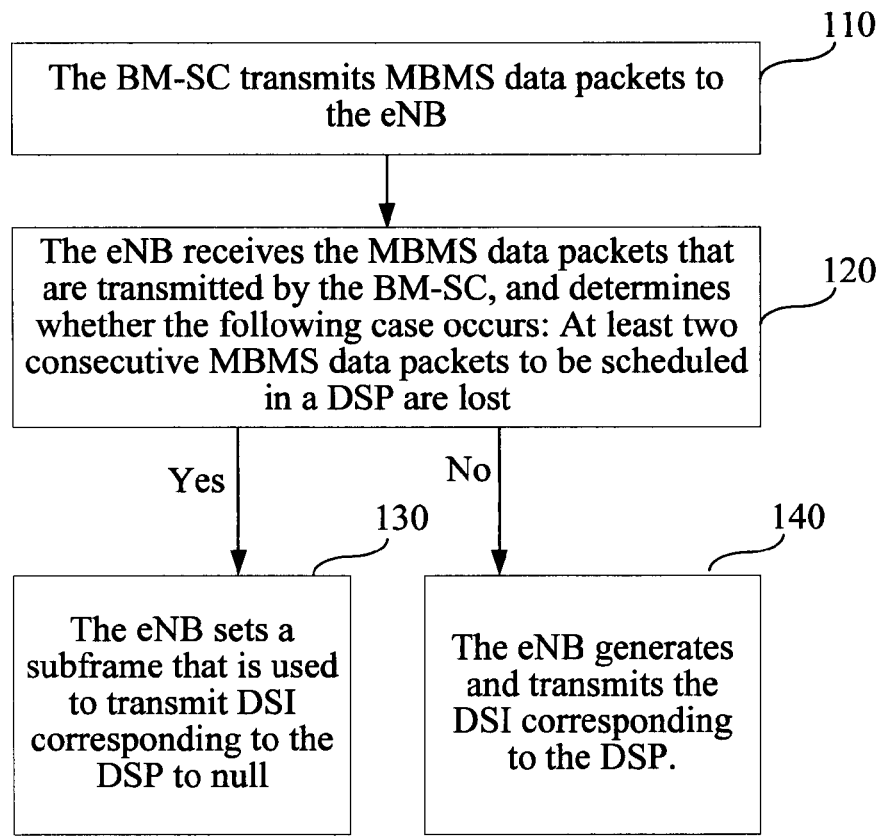
FIG. 1 is a schematic flow chart of a subframe processing method according to an embodiment of the present invention.

Another embodiment of the present invention provides a subframe processing method, as shown in FIG. 1. An eNB is located in an AN; a BM-SC is located in a CN; an SYNC entity on the BM-SC side may be an independent entity that is located on the CN and is able to communicate with the BM-SC, a part of the independent entity, or a unit inside a BM-SC device. The method includes the following steps.

Step 110: The BM-SC transmits MBMS data packets to the eNB.

For example, the BM-SC transmits a synchronization sequence, which includes multiple MBMS data packets, to the eNB. Generally, MBMS data packets in one synchronization sequence belong to one MBMS service. Besides, MBMS data packets in one synchronization sequence may belong to multiple MBMS services. The SYNC entity on the BM-SC side sets the same time stamp for each MBMS data packet in the synchronization sequence, and then transmits a type 0 PDU after the BM-SC transmits all MBMS data packets in the synchronization sequence.

Further, header information of the MBMS data packets may include a "total number of octet", which indicates the total amount of data transmitted by a data source in a certain period of time. Similar to the prior art, the value of the field of "total number of octet" monotonically increases in a certain time for data of a service. The header information of the MBMS data packets may further include a "total number of packet", which indicates the total amount of packets transmitted by a data source in a certain period of time. The data source refers to the BM-SC in this embodiment.

Figure 2:
FIG. 2 is a schematic diagram of a synchronization sequence transmitted by a BM-SC according to an embodiment of the present invention.

As shown in FIG. 2, assume that four consecutive MBMS data packets transmitted by the BM-SC to the eNB are A, B, C, and D. Lengths of A, B, C, and D are 100 bytes, 50 bytes, 150 bytes, and 100 bytes respectively. The values of the "total number of octet" information in the headers of the corresponding data packets are 100 bytes, 150 bytes, 300 bytes, and 400 bytes respectively. For example, the value of the "total number of octet" in the header of D indicates the total number of octets of D and the previous MBMS data packets, namely, 400 (100+50+150+100=400) bytes. Header information of A, B, C, and D further include total number of packet information (not shown in FIG. 2), of which values are 1, 2, 3, and 4 respectively. For example, the value of the total number of packet in the header of D indicates the total number of packets, which include D and the previous MBMS data packets, that are transmitted by the BM-SC, namely, 4.

Step 120: The eNB receives the MBMS data packets that are transmitted by the BM-SC, and determines whether the following case occurs: at least two consecutive MBMS data packets to be scheduled in a DSP are lost. If at least two consecutive MBMS data packets to be scheduled in a DSP are lost, the process proceeds to step 130; and if not at least two consecutive MBMS data packets to be scheduled in a DSP are lost, the process proceeds to step 140.

The preceding case determined by the eNB whether occurs may also be described as follows. At least two consecutive MBMS data packets to be scheduled in a DSP do not reach the eNB, that is, at least two consecutive MBMS data packets to be scheduled in a DSP are not received by the eNB.

For example, according to SYNC header information of the received MBMS data packets, the eNB determines whether consecutive data packets are lost and whether the consecutively lost data packets are supposed to be scheduled in the same DSP. The eNB may implement the operation according to the prior art.

As shown in FIG. 2, assume that two consecutive DSPs in which the eNB schedules MBMS data packets are DSP1 and DSP2 respectively. The start time of DSP1 is T1, and the start time of DSP2 that is later than DSP1 is T2. MBMS data packets shown in FIG. 2 are included in a synchronization sequence, that is, the MBMS data packets have the same time stamp. Assume that the time indicated in the time stamp is T0. In step 120, if the eNB determines that T0 is between T1 and T2, that is, T0 is later than T1 and earlier than T2, the eNB determines that it should schedule the MBMS data packets A, B, C, and D in DSP2.

Further, assume that the eNB receives only A and D, the eNB can buffer A and D. According to the total number of octets 100 in the header of A, total number of octets 400 in the header of D, and data packet length 100 of D, the eNB may determine that MBMS data of 200 (400−100−100=200) bytes is the lost data that should have been received by the eNB but does not reach the eNB. According to the total number of packets 1 in the header of A and the total number of packets 4 in the header of D, the eNB may determine that two MBMS data packets with the total number of packets 2 and 3 in the headers exist between A and D. Through the preceding process, the eNB may determine that two consecutive MBMS data packets (B and C) are lost. It should be noted that the eNB can only determine loss of data packets and the number of the lost data packets, and cannot determine the length of each lost data packet. Therefore, if the eNB predicts the length of each MBMS data packet and generates DSI according to the prior art, the DSI may be incorrect and may be different from DSI generated by other eNBs in other MBSFN areas. Consequently, the incorrect DSI interferes with other eNBs, and a UE may incorrectly receive data or even cannot receive data.

In the preceding process, according to the SYNC header information of the received MBMS data packets, the eNB determines that consecutive data packets are lost and the MBMS data packets that are not received are supposed to be scheduled in a DSP. The process proceeds to step 130.

Step 130: The eNB sets a subframe that is used to transmit DSI corresponding to the DSP to null.

For example, the eNB keeps mute in a subframe, the subframe being supposed to be used to transmit the DSI corresponding to the DSP. For another example, the eNB first determines whether to generate complete DSI corresponding to the DSP, and if it is determined not to generate the complete DSI corresponding to the DSP, the eNB keeps mute in a subframe, the subframe being supposed to be used to transmit the DSI corresponding to the DSP.

This step in which the eNB sets a subframe that is used to transmit the DSI corresponding to the DSP to null may also be described as follows. The eNB does not transmit any information when the eNB should transmit a subframe that carries the DSI. The DSI that should be generated is used to instruct the eNB how to dynamically schedule the MBMS data that is supposed to be transmitted in the DSP.

It should be noted that a subframe that is supposed to be used to transmit the DSI corresponding to a DSP in the embodiment of the present invention refers to a subframe X in a DSP (for example, a first subframe in a DSP). If the eNB generates DSI, the eNB is to transmit the DSI in the subframe X. In the embodiment of the present invention, the eNB does not generate DSI when the eNB determines that the data packets that are not received meet a given condition (for example, step 120). Therefore, the eNB keeps mute in the subframe X.

In this step, the eNB may transmit the MBMS data packets in the DSP. In details, if other MBMS data packets that have been received by the eNB and are to be scheduled in the DSP exist, the eNB may transmit the other MBMS data packets in other subframes in the DSP. Optionally, if a subframe that is supposed to be used to transmit the DSI corresponding to the DSP is the first subframe of the DSP, the other subframes may be after the subframe that is supposed to be used to transmit the DSI corresponding to the DSP. If a subframe that is supposed to be used to transmit the DSI corresponding to the DSP is not the first subframe of the DSP, the other subframes may be before or after the subframe that is supposed to be used to transmit the DSI corresponding to the DSP. Optionally, other MBMS data packets may include: MBMS data packets of which time of transmission by the BM-SC is earlier than the time of transmission of the determined lost consecutive MBMS data packets by the BM-SC, and which belong to the same service as the determined lost consecutive MBMS data packets; and/or MBMS data packets of other services that are supposed to be scheduled before the eNB schedules a service of the determined lost consecutive MBMS data packets. In the latter case, the other MBMS data packets belong to a service different from that of the lost consecutive MBMS data packets. The time of transmission of the other MBMS data packets by the BM-SC may not be earlier than the time of transmission of the determined lost consecutive MBMS data packets by the BM-SC.

As shown in FIG. 2, the eNB has received A in step 120. According to header information of the received MBMS data packets, the eNB can know that the time when the BM-SC transmits A is earlier than the time when the BM-SC transmits the lost consecutive data packets (B and C). In addition, the eNB has also received D. The time when the BM-SC transmits D is later than the time when the BM-SC transmits the lost consecutive data packets. Therefore, in the DSP, the eNB can use a subframe after a null subframe that is supposed to be used to transmit the DSI to transmit A. The eNB can only determine the number and the total length of the lost data packets, but cannot determine the length of each lost data packet (B and C). Therefore, the eNB cannot determine the transmission position of each lost data packet and cannot determine the transmission position of D that is transmitted later than the lost data packets. As a result, the eNB cannot transmit D even when the eNB has received D.

Assume that the eNB transmits A in a manner of dynamic scheduling according to the prior art. Accordingly, a UE can read all information in the DSP when the UE does not receive the DSI corresponding to the DSP. The UE can read MBMS data packet A. Compared with the method in which the eNB transmits no data packet or transmits incorrect DSI, the method according to this embodiment enables the UE to receive more data, and enables the eNB to transmit data more efficiently.

Optionally, assume that the DSP includes a subframe being supposed to be used to transmit the DSI, other subframes that are used to transmit the other MBMS data packets, and remaining subframes, the eNB may keep mute in the remaining subframes after transmitting the other MBMS data packets in the DSP. It should be noted that the subframes that form the DSP are subframes of an MCH reserved by the eNB for transmitting the MBMS data packets, and "the eNB keeps mute in the remaining subframes of the DSP" means that the eNB does not transmit any information on an MCH that is used to transmit MBMS data packets in the remaining subframes.

It is understandable by persons of ordinary skill in the art that the eNB may transmit non-MBMS data packets in the remaining subframes. These non-MBMS data packets occupy non-MCHs. For example, the eNB may transmit unicast data packets at low power in the remaining subframes. These unicast data packets are carried on a dedicated traffic channel (DTCH). The occupied transmission channel is a downlink shared channel (DL-SCH).

Step 140: The eNB generates and transmits the DSI corresponding to the DSP.

In this step, the eNB can generate and transmit the DSI according to the prior art. After transmitting a subframe that carries the DSI, the eNB transmits the received MBMS data packets.

In this embodiment, the eNB may first determine whether data packets that are not received meet a given condition. For example, the eNB determines whether the data packets that are not received include at least two consecutive MBMS data packets to be scheduled by the eNB in a DSP. If the given condition is met, the eNB sets a subframe that is used to transmit DSI corresponding to the DSP to null to prevent the eNB from transmitting incorrect DSI which may interfere with other eNBs and cause incorrect data receiving of the UE.

Another embodiment of the present invention provides a subframe processing method. In this method, if an eNB does not receive a type 0 control packet group, that is, data packets that are not received by the eNB include a type 0 control packet group, the eNB sets a subframe that is used to transmit DSI corresponding to a DSP to null. The DSP is used to transmit MBMS data packets corresponding to the type 0 control packet group. This method can prevent the eNB from transmitting incorrect DSI which may interfere with other eNBs and cause incorrect data receiving of a UE.

Figure 3:
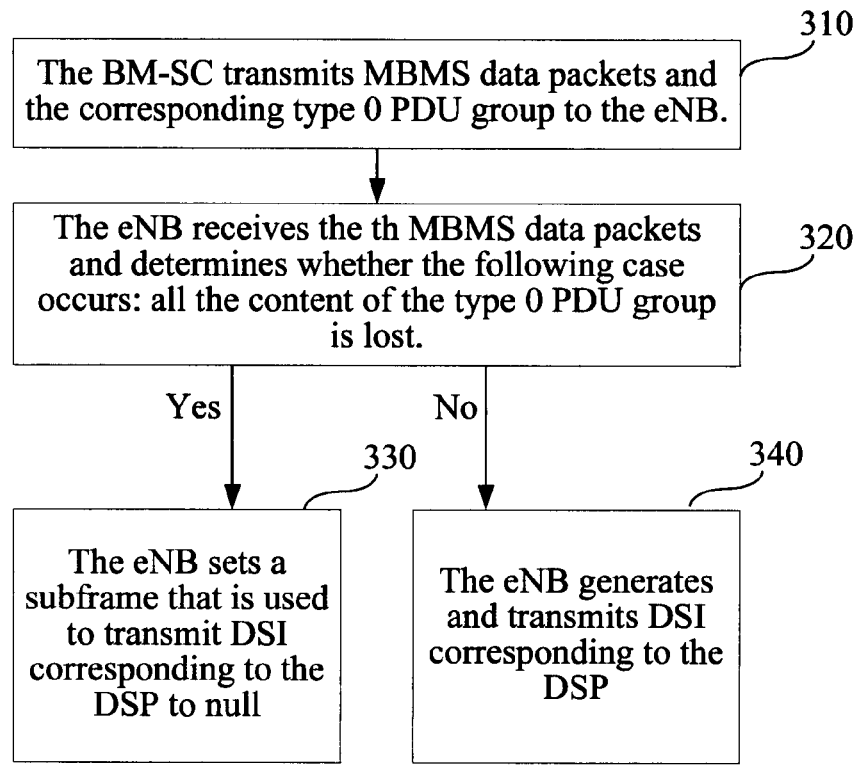
FIG. 3 is a schematic flow chart of another subframe processing method according to an embodiment of the present invention.

Another embodiment of the present invention provides a subframe processing method, as shown in FIG. 3. An eNB is located on an AN; a BM-SC is located on a CN; an SYNC entity on the BM-SC side may be an independent entity that is located on the CN and can communicate with the BM-SC, a part of the independent entity, or a unit inside a BM-SC device. The method includes the following steps.

Step 310: The BM-SC transmits a synchronization sequence formed of MBMS data packets and the corresponding type 0 PDU group to the eNB.

Figure 4:
FIG. 4 is a schematic diagram of another synchronization sequence transmitted by a BM-SC according to an embodiment of the present invention.

As shown in FIG. 4, the BM-SC transmits four synchronization sequences E, F, G, and H to the eNB. Each synchronization sequence includes several MBMS data packets. The number of the MBMS data packets included in each synchronization sequence may be the same or different. This embodiment does not restrict that the MBMS data packets in a synchronization sequence belong to one or more MBMS services. This embodiment does not restrict whether the MBMS data packets in a synchronization sequence are empty. For example, MBMS data packets in G are empty, or G does not contain any MBMS data.

In this step, the SYNC entity on the BM-SC side sets a time stamp for each MBMS data packet in each synchronization sequence. After transmitting all MBMS data packets in a synchronization sequence, the BM-SC transmits a type 0 PDU group corresponding to the synchronization sequence. Each type 0 PDU group that corresponds to a synchronization sequence may include multiple type 0 PDUs. The type 0 PDUs may have the same information and may have the same time stamp as the MBMS data packets in the corresponding synchronization sequence. Type 0 PDUs that are repeatedly transmitted by the BM-SC may form a type 0 PDU group.

As shown in FIG. 4, a type 0 PDU group corresponding to each synchronization sequence includes three type 0 PDUs, which are marked as 1, 2, and 3 according to the sequence in each type 0 PDU group. Optionally, a type 0 PDU in a type 0 PDU group corresponding to synchronization sequence E may carry a time stamp. The time stamp is the same as the time stamp of the MBMS data in synchronization sequence E. Assume that the time stamp is Te. MBMS data packets in synchronization sequence G are null, that is, G does not include MBMS data. A type 0 PDU in a type 0 PDU group corresponding to synchronization sequence G may carry a time stamp, and the time stamp may be a value in the time range of synchronization sequence H. Assume that the time stamp is Tg. In addition, assume that the time indicated by a time stamp of MBMS data packets in synchronization sequence F and the time indicated by a time stamp of MBMS data packets in synchronization sequence H are Tf and Th respectively. Header information of each MBMS data packet is not illustrated in FIG. 4.

Further, the header information of the MBMS data packets may further include the total number of octets and the total number of packets. The header information is similar to the header information in other embodiments of the present invention, and is not described here.

Step 320: The eNB receives the synchronization sequence transmitted by the BM-SC and determines whether the following case occurs: one type 0 PDU group is lost. If one type 0 PDU group is lost, the process proceeds to step 330; and if no one type 0 PDU group is lost, the process proceeds to step 340.

The preceding case may also be described as follows. A type 0 PDU group corresponding to a synchronization sequence that is received or not received by the eNB does not reach the eNB, that is, all type 0 PDUs in the type 0 group are not received by the eNB. A synchronization sequence may include multiple MBMS data packets. Time stamps of MBMS data packets in a synchronization sequence are the same, that is, multiple MBMS data packets in a synchronization sequence correspond to a type 0 PDU group, which means, each MBMS data packet has a unique type 0 PDU group. The preceding case the eNB determines whether occurs may also be described as follows. A type 0 PDU group corresponding to MBMS data packets that are received or not received by the eNB does not reach the eNB, that is, all type 0 PDUs in the type 0 group are not received by the eNB.

It should be noted that the subframe processing method provided by this embodiment is applicable to various scenarios where an eNB may determine loss of a type 0 PDU group. In details, if a type 0 PDU group is lost, an eNB may determine the type 0 PDU group that should reach the eNB but is not received by the eNB according to information related to the received MBMS data packets such as a time stamp, the total number of octets, or the total number of packets, regardless of whether all or part of synchronization sequences corresponding to the type 0 PDU group are received by the eNB, or synchronization sequences corresponding to the type 0 PDU group are empty. Therefore, the subframe processing method provided by this embodiment is applicable to various scenarios.

In this embodiment, assume that two consecutive DSPs in which the eNB schedules MBMS data packets are DSP3 and DSP4 respectively. The start time of DSP3 is T3, and the start time of DSP4 that is later than DSP3 is T4.

As shown in FIG. 4, in step 320, if the eNB determines that Te, Tf, Tg, and Th are between T3 and T4, that is, Te, Tf, Tg, and Th are later than T3 and earlier than T4, the eNB determines that the eNB should schedule the MBMS data packets in E, F, G, and H in DSP4.

Further, the eNB may determine a range of time stamp in which each synchronization sequence is supposed to be received according to the pre-configuration. Therefore, if the eNB does not receive any type 0 PDU and the time stamp is in a range of time stamp determined according to the pre-configuration, it is determined that a type 0 PDU group is lost. If information of at least one PDU group in the preceding four type 0 PDU groups is lost, the process proceeds to step 330.

As shown in FIG. 4, the eNB does not receive a first type 0 PDU, a second type 0 PDU, and a third type 0 PDU corresponding to F; therefore, the eNB cannot determine the time of transmission completion of data packets in synchronization sequence F even when the eNB receives synchronization sequence F. If the eNB predicts the time of transmission completion of data packets in the synchronization sequence according to the prior art, the time is inaccurate. Therefore, DSI generated by the eNB according to the prediction result is inaccurate, and is different from DSI generated by other eNBs in other MBSFN areas. Consequently, the incorrect DSI interferes with other eNBs, and a UE may incorrectly receive data or even cannot receive data. In this embodiment, after the eNB determines that all information in a type 0 PDU group corresponding to F is lost, the process proceeds to step 330.

If at least one type 0 PDU in each type 0 PDU group in the preceding four type 0 PDU groups is received by the eNB, the eNB may determine the time of transmission completion of each synchronization sequence. The process proceeds to step 340.

Step 330: The eNB sets a subframe that is used to transmit DSI corresponding to a DSP to null. The DSP is used to transmit MBMS data packets corresponding to a type 0 PDU group or MBMS data packets in a synchronization sequence that are not received by the eNB.

For example, the eNB keeps mute in a subframe, the subframe being supposed to be used to transmit DSI corresponding to the DSP. Further, for example, the eNB first determines whether to generate complete DSI corresponding to the DSP. If it is determined not to generate the complete DSI corresponding to the DSP, the eNB keeps mute in a subframe, the subframe being supposed to be used to transmit the DSI corresponding to the DSP.

This step in which the eNB sets a subframe that is used to transmit DSI corresponding to the DSP to null may also be described as follows. The eNB does not transmit any information when the eNB should transmit a subframe that carries the DSI. The DSI that should be generated is used to instruct the eNB how to dynamically schedule MBMS data that is supposed to be transmitted in the DSP.

In this step, the eNB may transmit MBMS data packets in the DSP. In details, if other MBMS data packets that have been received by the eNB and are to be scheduled in the DSP exist, the eNB may transmit the other MBMS data packets in other subframes in the DSP. Optionally, the other MBMS data packets may include MBMS data packets of which time of transmission by the CN device BM-SC is earlier than the end time of a synchronization sequence corresponding to a lost type 0 PDU group; and/or MBMS data packets that are supposed to be scheduled by the eNB before the eNB schedules a service of MBMS data packets corresponding to a lost type 0 PDU group, and which belong to a service different from that of the MBMS data packets corresponding to the lost type 0 PDU group.

As shown in FIG. 4, the eNB has received synchronization sequence E in step 320, and MBMS data packets in E are to be scheduled in the DSP. In addition, according to header information of the received MBMS data packets, the eNB can know that the time of transmission of E by the BM-SC is earlier than the time of transmission of the synchronization sequence (F) corresponding to the lost type 0 PDU group. Therefore, in the DSP, in subframes after the null subframe that is supposed to be used to transmit DSI, the eNB may transmit the received MBMS data packets in synchronization sequence E. If the eNB does not receive the type 0 PDU group corresponding to synchronization sequence F, but receives some MBMS data packets in synchronization sequence F, the eNB may transmit the received MBMS data packets in synchronization sequence F after transmitting MBMS data packets in E. The eNB cannot determine whether transmission of F is completed, so the eNB cannot determine the transmission positions of MBMS data packets in G and H in the DSP even when the eNB receives synchronization sequences G and H transmitted by the BM-SC. Therefore, the eNB does not transmit the received MBMS data packets in G and H. Further, assume that the eNB transmits E in a manner of dynamic scheduling according to the prior art. Accordingly, a UE can read all information in the DSP when the UE does not receive the DSI corresponding to the DSP. The UE can read MBMS data packets in E. Compared with the method in which the eNB transmits no data packet or transmits incorrect DSI, the method provided by this embodiment enables the UE to receive more data, and enables the eNB to transmit data more efficiently.

Further, assume that the DSP includes a subframe that is supposed to be used to transmit DSI, other subframes that are used to transmit the other MBMS data packets, and remaining subframes, the eNB may keep mute in the remaining subframes after transmitting the other MBMS data packets in the DSP. It should be noted that the subframes that form the DSP are subframes of an MCH reserved by the eNB for transmitting MBMS data packets, and "the eNB may keep mute in the remaining subframes" means that the eNB does not transmit any information on an MCH that is used to transmit MBMS data packets corresponding to the lost type 0 control packet group in the remaining subframes.

It is understandable by persons of ordinary skill in the art that the eNB may transmit non-MBMS data packets in the remaining subframes. The non-MBMS data packets occupy non-MCHs. For example, the eNB may transmit unicast data packets at low power in the remaining subframes. The unicast data packets are carried on a DTCH. The occupied transmission channel is a DL-SCH.

Step 340: The eNB generates and transmits the DSI corresponding to the DSP.

In this step, the eNB can generate and transmit the DSI according to the prior art. After transmitting a subframe that carries the DSI, the eNB transmits the received MBMS data packets.

In this embodiment, the eNB may first determine whether data packets that are not received meet a given condition. For example, the eNB determines whether data packets that are not received by the eNB include a type 0 PDU group corresponding to one or more MBMS data packets. If the given condition is met, the eNB sets a subframe that is used to transmit the DSI corresponding to the DSP to null to prevent the eNB from transmitting incorrect DSI which may interfere with other eNBs and cause incorrect data receiving of the UE.

The two subframe processing methods provided by the aforementioned embodiments of the present invention may be combined to form another embodiment of the present invention. In the embodiment of the present invention, an eNB may first determine whether data packets that are not received meet a given condition. That is, the eNB determines whether data packets that are not received include two consecutive MBMS data packets to be scheduled by the eNB in a DSP and a type 0 PDU group corresponding to one or more MBMS data packets. The one or more MBMS data packets may be MBMS data packets that have been or have not been received by the eNB. If the given condition is met, the eNB sets a subframe that is used to transmit DSI corresponding to the DSP to null to prevent the eNB from transmitting incorrect DSI which may interfere with other eNBs and cause incorrect data receiving of a UE. In the embodiment of the present invention, the method for the eNB to determining whether data packets that are not received meet the given condition is the same as the method described in the aforementioned embodiments of the present invention, and is not described here.

In the subframe processing methods provided by the aforementioned embodiments of the present invention, the eNB is an AN device, and the BM-SC is a CN device, but the eNB device and the BM-SC device are not limited to an AN device and a CN device in embodiments of the present invention. For example, the eNB in the aforementioned embodiments of the present invention may be replaced by other devices such as a home NodeB (hNB), a microcell NodeB, or other devices on the AN in an LTE+ system; and the BM-SC may be replaced by other devices on the CN.

Figure 5:
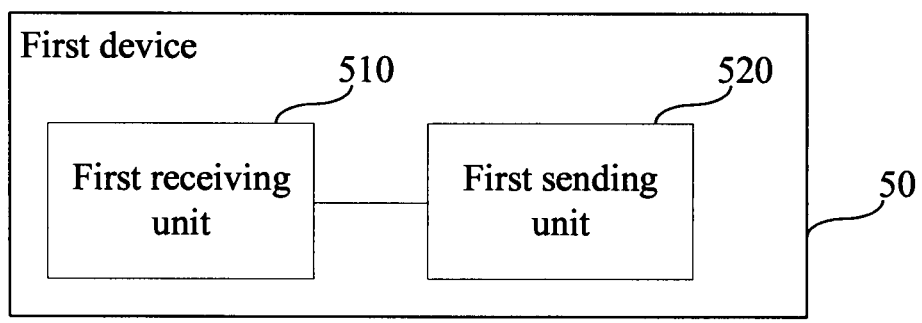
FIG. 5 is a schematic diagram of a subframe processing device according to an embodiment of the present invention.

As shown in FIG. 5, an embodiment of the present invention further provides a subframe processing device, namely, a first device 50, which is configured to implement the subframe processing methods provided by the aforementioned embodiments of the present invention. The first device 50 includes a first receiving unit 510 and a first sending unit 520. The first receiving unit 510 is configured to determine whether data packets that are not received meet a first condition: the data packets that are not received include at least two consecutive MBMS data packets to be scheduled by the first sending unit 520 in a DSP. The first sending unit 520 is configured to set a subframe that is used to transmit DSI corresponding to the DSP to null when the determination result of the first receiving unit 510 is yes.

"The first sending unit 520 is configured to set a subframe that is used to transmit DSI corresponding to the DSP to null" may refer to any one of the following cases: the first sending unit 520 keeps mute in a subframe that is supposed to be used to transmit DSI corresponding to the DSP; or the first sending unit 520 determines whether to generate complete DSI corresponding to the DSP, and if it is determined not to generate the complete DSI corresponding to the DSP, the first sending unit 520 keeps mute in a subframe that is supposed to be used to transmit DSI corresponding to the DSP.

In this embodiment, the first receiving unit 510 may be configured to receive MBMS data packets and determine whether data packets that are not received meet the first condition according to the received MBMS data packets. For example, header information of the MBSM data packets received by the first receiving unit 510 includes the total number of octets and the total number of packets. The first receiving unit 510 determines whether data packets that are not received meet the first condition according to the total number of octets and the total number of packets.

Optionally, in this embodiment, if other MBMS data packets that have been received by the first receiving unit 510 and are to be scheduled by the first sending unit 520 in the DSP exist, optionally, the other MBMS data packets include any one or more of the following MBMS data packets: MBMS data packets of which time of transmission by the BM-SC is earlier than the time of transmission of the determined lost consecutive MBMS data packets by the BM-SC, and which belong to a same service as the determined lost consecutive MBMS data packets; and MBMS data packets of other services that are to be scheduled before the eNB schedules a service of the determined lost consecutive MBMS data packets. In the latter case, the other MBMS data packets belong to a service different from that of the lost consecutive MBMS data packets. The time of transmission of the other MBMS data packets by the BM-SC may not be earlier than the time of transmission of the determined lost consecutive MBMS data packets by the BM-SC.

Optionally, if a subframe that is supposed to be used to transmit DSI corresponding to the DSP is a first subframe of the DSP, the other subframes may be after the subframe that is supposed to be used to transmit DSI corresponding to the DSP. If the subframe that is supposed to be used to transmit DSI corresponding to the DSP is not a first subframe of the DSP, the other subframes can be before or after the subframe that is supposed to be used to transmit DSI corresponding to the DSP.

Optionally, the first sending unit 520 in this embodiment is further configured to keep mute in remaining subframes after transmitting the other MBMS data packets. The remaining subframes include subframes that are after the other subframes in the DSP and reserved for a transmission channel that maps a service of the consecutive MBMS data packets by the first sending unit 520.

The device according to this embodiment may be a NodeB (such as eNB) or other AN entities, such as an hNB) or microcell NodeB, or a unit that is inside a NodeB or other AN entities. The device may first determine whether data packets that are not received meet a given condition. For example, the device determines whether data packets that are not received include at least two consecutive MBMS data packets to be scheduled by the eNB in a DSP. If the given condition is met, the device sets a subframe that is used to transmit the DSI corresponding to the DSP to null to prevent the device from transmitting incorrect DSI which may interfere with other devices and cause incorrect data receiving of a UE.

Figure 6:
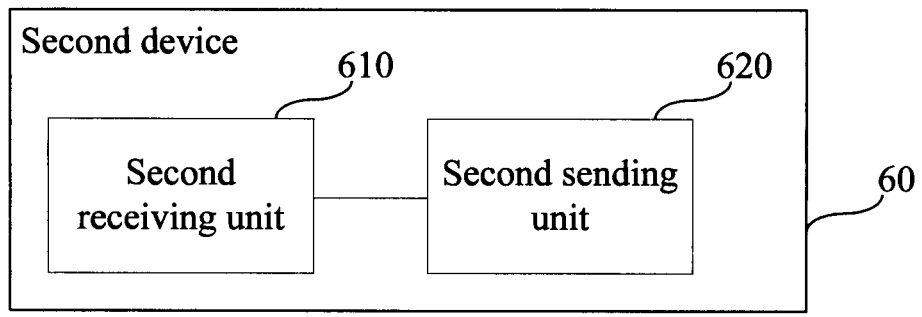
FIG. 6 is a schematic diagram of another subframe processing device according to an embodiment of the present invention.

As shown in FIG. 6, an embodiment of the present invention further provides another subframe processing device, namely, a second device 60, which is configured to implement the subframe processing methods provided by the aforementioned embodiments of the present invention. The second device 60 includes a second receiving unit 610 and a second sending unit 620. The second receiving unit 610 is configured to determine whether a type 0 control packet group is not received, that is, the second receiving unit 610 determines whether data packets that are not received meet a second condition that is the data packets that are not received include a type 0 control packet group. The second sending unit 620 is configured to set a subframe that is used to transmit DSI corresponding to a DSP to null, where the DSP is used to transmit MBMS data packets corresponding to the type 0 control packet group when the determination result of the second receiving unit 610 is yes.

"The second sending unit 620 is configured to set a subframe that is used to transmit DSI corresponding to the DSP to null" may refer to any one of the following cases: the second sending unit 620 keeps mute in a subframe, the subframe being supposed to be used to transmit DSI corresponding to the DSP; or the second sending unit 620 determines whether to generate complete DSI corresponding to the DSP, and if it is determined not to generate the complete DSI corresponding to the DSP, the second sending unit 620 keeps mute in a subframe, the subframe being supposed to be used to transmit DSI corresponding to the DSP.

Optionally, in this embodiment, if other MBMS data packets that have been received by the second receiving unit 610 and are to be scheduled by the second sending unit 620 in the DSP exist, the second sending unit 620 is further configured to transmit the other MBMS data packets in other subframes in the DSP. Optionally, the other MBMS data packets may include MBMS data packets of which time of transmission by the CN device BM-SC is earlier than the end time of a synchronization sequence corresponding to a lost type 0 PDU group; and/or MBMS data packets that are supposed to be scheduled before scheduling a service of MBMS data packets corresponding to the lost type 0 PDU group, and which belong to a service different from that of the MBMS data packets corresponding to the lost type 0 PDU group.

Optionally, if a subframe that is supposed to be used to transmit DSI corresponding to the DSP is a first subframe of the DSP, the other subframes may be after the subframe is supposed to be used to transmit DSI corresponding to the DSP. If the subframe is supposed to be used to transmit DSI corresponding to the DSP is not a first subframe of the DSP, the other subframes may be before or after the subframe is supposed to be used to transmit DSI corresponding to the DSP.

Optionally, the second sending unit 620 is further configured to keep mute in remaining subframes after transmitting the other MBMS data packets. The remaining subframes include subframes that are after the other subframes in the DSP and reserved for a transmission channel that maps a service of MBMS data packets corresponding to the type 0 control packet group by the eNB.

In the embodiment of the present invention, the type 0 control packet group includes all type 0 control packets that include the same information and are transmitted repeatedly.

The device according to this embodiment may be a NodeB (such as eNB) or other AN entities, such as an hNB or microcell NodeB, or a unit that is inside a NodeB or other AN entities. The device may first determine whether data packets that are not received meet a given condition. For example, the device determines whether data packets that are not received include a type 0 PDU group corresponding to one or more MBMS data packets. If the given condition is met, the device sets a subframe that is used to transmit DSI corresponding to the DSP to null to prevent the device from transmitting incorrect DSI which may interfere with other devices and cause incorrect data receiving of a UE.

Persons of ordinary skill in the art may understand that all or part of the steps of the methods according to the embodiments of the present invention may be implemented by a program instructing relevant hardware. The program may be stored in a computer readable storage medium. The storage medium may be a Read-only Memory (ROM)/Random-access Memory (RAM), a magnetic disk or an optical disk.

The above descriptions are merely preferred embodiments of the present invention. It should be noted that persons of ordinary skill in the art can make various improvements and variations without departing from the principle of the invention. All such modifications and variations fall within the scope of the present invention.

What is claimed is:

1. A subframe processing method, the method comprising:
   determining, by an evolved NodeB (eNB), that a type 0 control packet group is not received;
   determining that the eNB is not able to generate complete Dynamic Schedule Information (DSI) corresponding to a Dynamic Schedule Period (DSP); and
   keeping mute in a subframe, by the eNB, wherein the subframe is to be used to transmit the DSI corresponding to the DSP, wherein the DSP is used to transmit Multimedia Broadcast Multicast Service (MBMS) data packets corresponding to the type 0 control packet group.

2. The method according to claim 1, the method further comprising determining, by the eNB, a range of time stamp in which each synchronization sequence is to be received according to pre-configuration;
   wherein determining that the eNB does not receive the type 0 control packet group comprises determining, by the eNB, that the type 0 control packet group of a type 0 control packet is not received if the eNB does not receive the type 0 control packet, a time stamp of which is in the range of time stamp.

3. The method according to claim 1, the method further comprising determining that other MBMS data packets that have been received and are to be scheduled in the DSP by the eNB exist, and transmitting, by the eNB, the other MBMS data packets in other subframes in the DSP,
   wherein the other MBMS data packets comprise:
   MBMS data packets, wherein time of a transmission, by a core network (CN) device, of the MBMS data packets is earlier than end time of a synchronization sequence corresponding to the type 0 control packet group; and/or
   MBMS data packets, wherein the MBMS data packets are to be scheduled by the eNB before the eNB schedules a service of the MBMS data packets corresponding to the type 0 control packet group, and the MBMS data packets belong to a service different from that of the MBMS data packets corresponding to the type 0 control packet group.

4. The method according to claim 3, wherein after the eNB transmits the other MBMS data packets, the method further comprises:
   by the eNB, keeping mute in remaining subframes, wherein the remaining subframes comprise subframes being after the other subframes in the DSP and reserved for a transmission channel that maps a service of the MBMS data packets corresponding to the type 0 control packet group by the eNB.

5. A subframe processing device, comprising a first unit and a second unit, wherein:
   the first unit is configured to determine that a type 0 control packet group is not received; and
   the second unit is configured to determine not able to generate complete Dynamic Schedule Information (DSI) corresponding to a Dynamic Schedule Period (DSP), and to keep mute in a subframe, wherein the subframe is to be used to transmit the DSI corresponding to the DSP; wherein the DSP is used to transmit Multimedia Broadcast Multicast Service (MBMS) data packets corresponding to the type 0 control packet group.

6. The device according to claim 5, wherein if other MBMS data packets that have been received by the first unit and are to be scheduled by the second unit in the DSP exist, the second unit is further configured to transmit the other MBMS data packets in other subframes in the DSP,
   wherein the other MBMS data packets comprise:
   MBMS data packets, wherein time of a transmission, by a core network (CN) device, of the MBMS data packets is earlier than end time of a synchronization sequence corresponding to the type 0 control packet group; and/or
   MBMS data packets, wherein the MBMS data packets are to be scheduled before an evolved NodeB (eNB) schedules a service of MBMS data packets corresponding to the type 0 control packet group, and the MBMS data packets belong to a service different from that of the MBMS data packets corresponding to the type 0 control packet group.

7. The device according to claim 6, wherein the second unit is further configured to keep mute in remaining subframes after transmitting the other MBMS data packets, and remaining subframes comprise subframes being after the other subframes in the DSP and reserved for a transmission channel that maps the service of the MBMS data packets corresponding to the type 0 control packet group.

8. A subframe processing method, the method comprising:
   determining, by an evolved NodeB (eNB), that a type 0 control packet group is not received; and
   setting a subframe to null, by the eNB, wherein the subframe is to be used to transmit Dynamic Schedule Information (DSI) corresponding to a Dynamic Schedule Period (DSP), wherein the DSP is used to transmit Multimedia Broadcast Multicast Service (MBMS) data packets corresponding to the type 0 control packet group.

9. The method according to claim 8, wherein setting the subframe to null comprises keeping mute in the subframe.

10. The method according to claim 8, further comprising:
determining, by the eNB, a range of time stamp in which each synchronization sequence is to be received according to pre-configuration;
wherein the eNB does not receive the type 0 control packet group comprises:
determining, by the eNB, that the type 0 control packet group of a type 0 control packet is not received if the eNB does not receive the type 0 control packet, a time stamp of which is in the range of time stamp.

11. The method according to claim 8, the method further comprising:
receiving, by the eNB, other MBMS data packets that are to be scheduled in the DSP; and
transmitting, by the eNB, the other MBMS data packets in other subframes in the DSP,
wherein the other MBMS data packets comprise:
MBMS data packets, wherein time of a transmission, by a core network (CN) device, of the MBMS data packets is earlier than end time of a synchronization sequence corresponding to the type 0 control packet group; and/or
MBMS data packets, wherein the MBMS data packets are to be scheduled by the eNB before the eNB schedules a service of the MBMS data packets corresponding to the type 0 control packet group, and the MBMS data packets belong to a service different from that of the MBMS data packets corresponding to the type 0 control packet group.

12. The method according to claim 11, wherein, after the eNB transmits the other MBMS data packets, the method further comprises the eNB, keeping mute in remaining subframes, wherein the remaining subframes comprise subframes being after the other subframes in the DSP and reserved for a transmission channel that maps a service of the MBMS data packets corresponding to the type 0 control packet group by the eNB.

13. A subframe processing device, comprising:
a first unit configured to determine that a type 0 control packet group is not received; and
a second unit configured to set a subframe to null, wherein the subframe is to be used to transmit Dynamic Schedule Information (DSI) corresponding to a Dynamic Schedule Period (DSP) and wherein the DSP is used to transmit Multimedia Broadcast Multicast Service (MBMS) data packets corresponding to the type 0 control packet group.

14. The device according to claim 13, wherein the second unit is configured to keep mute in the subframe.

15. The device according to claim 13, wherein the device further comprises a third unit, configured to determine a range of time stamp in which each synchronization sequence is to be received according to pre-configuration;
wherein the first unit is further configured to determine that the type 0 control packet group of a type 0 control packet is not received if the type 0 control packet is not received, and a time stamp of the type 0 control packet is in the range of time stamp.

16. The device according to claim 13, wherein if other MBMS data packets that have been received by the first unit and are to be scheduled by the second unit in the DSP exist, the second unit is further configured to transmit the other MBMS data packets in other subframes in the DSP,
wherein the other MBMS data packets comprise:
MBMS data packets, wherein time of a transmission, by a core network (CN) device, of the MBMS data packets is earlier than end time of a synchronization sequence corresponding to the type 0 control packet group; and/or
MBMS data packets, wherein the MBMS data packets are to be scheduled before an evolved NodeB (eNB) schedules a service of MBMS data packets corresponding to the type 0 control packet group, and the MBMS data packets belong to a service different from that of the MBMS data packets corresponding to the type 0 control packet group.

17. The device according to claim 16, wherein the second unit is further configured to keep mute in remaining subframes, wherein remaining subframes comprise subframes being after the other subframes in the DSP and reserved for a transmission channel that maps the service of the MBMS data packets corresponding to the type 0 control packet group.

* * * * *